United States Patent
Sawa et al.

(10) Patent No.: US 7,498,517 B2
(45) Date of Patent: Mar. 3, 2009

(54) MICA TAPE, ELECTRICAL ROTATING MACHINE COIL, AND ELECTRICAL ROTATING MACHINE COMPRISING THE ELECTRICAL ROTATING MACHINE COIL

(75) Inventors: Fumio Sawa, Tokyo (JP); Noriyuki Iwata, Sagamihara (JP); Hiroshi Hatano, Chofu (JP); Tetsushi Okamoto, Kawasaki (JP); Kazuma Mukai, Higashimurayama (JP); Toshiyuki Aso, Machida (JP); Makoto Kawahara, Yokohama (JP); Mikio Kakiuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/753,091

(22) Filed: May 24, 2007

(65) Prior Publication Data

US 2007/0222307 A1    Sep. 27, 2007

Related U.S. Application Data

(63) Continuation of application No. PCT/JP2006/319365, filed on Sep. 28, 2006.

(30) Foreign Application Priority Data

Sep. 29, 2005    (JP)    ............... 2005-283422

(51) Int. Cl.
H01B 7/00    (2006.01)

(52) U.S. Cl. ............... 174/110 R; 174/120 R; 174/120 C

(58) Field of Classification Search ............. 174/110 R, 174/110 FC, 113 R, 120 R, 120 C, 120 SC, 174/121 R, 122 R, 124 R, 124 G, 124 GC
See application file for complete search history.

(56) References Cited

U.S. PATENT DOCUMENTS

| 5,540,969 A | * | 7/1996 | Schuler ................. 442/212 |
| 6,242,825 B1 | * | 6/2001 | Mori et al. ................. 310/45 |
| 6,426,578 B1 | * | 7/2002 | Mori et al. ................. 310/214 |
| 6,563,413 B1 | * | 5/2003 | Ponweiser et al. ........... 336/186 |
| 6,699,804 B1 | * | 3/2004 | Jacques et al. ............. 442/149 |
| 2004/0094325 A1 | | 5/2004 | Yoshida et al. |
| 2005/0097726 A1 | * | 5/2005 | Yamamoto et al. ............ 29/606 |
| 2005/0208301 A1 | | 9/2005 | Okamoto et al. |

FOREIGN PATENT DOCUMENTS

| JP | 5-211015 A | 8/1993 |
| JP | 6-223662 A | 8/1994 |
| JP | 2002-93257 A | 3/2002 |

(Continued)

*Primary Examiner*—William H Mayo, III
(74) *Attorney, Agent, or Firm*—Oblon, Spivak, McClelland, Maier & Neustadt, P.C.

(57) ABSTRACT

A mica tape comprising a mica foil, a glass cloth, and an inorganic filler arranged on the glass cloth, wherein the mica tape is wound a plurality of times about an outer circumferential surface of a conductor portion of an electrical rotating machine coil so as to form an insulating layer for the coil, and the inorganic filler has a Mohs hardness falling within a range of 1 to 7 and exhibits a heat conductivity superior to those of the mica foil and the glass cloth, whereby, the inorganic filler is excellent in the heat conductivity and has a Mohs hardness not lower than that of the glass cloth contained in the mica tape, when used together with the inorganic filler.

14 Claims, 3 Drawing Sheets

FOREIGN PATENT DOCUMENTS

| | | | |
|---|---|---|---|
| JP | 2002-118997 A * | 4/2002 |
| JP | 2002-330562 A | 11/2002 |
| JP | 2003-9446 A | 1/2003 |
| JP | 2004-349115 A | 12/2004 |
| JP | 2005-6389 A | 1/2005 |

* cited by examiner

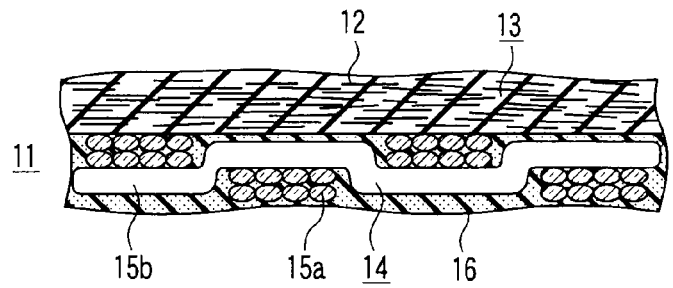
FIG. 1
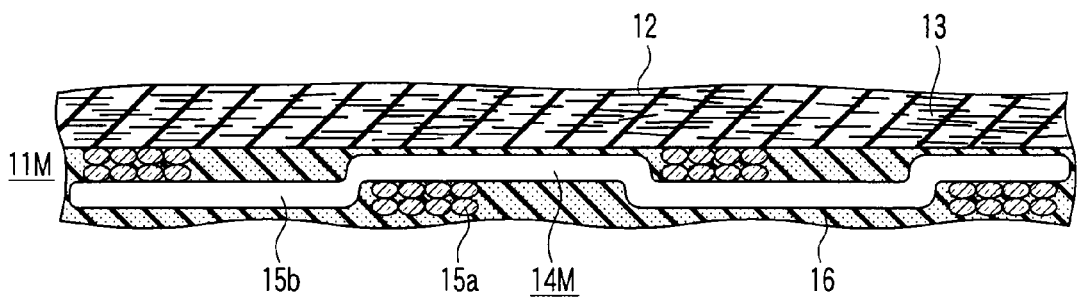
FIG. 2
FIG. 3

MICA TAPE, ELECTRICAL ROTATING MACHINE COIL, AND ELECTRICAL ROTATING MACHINE COMPRISING THE ELECTRICAL ROTATING MACHINE COIL

CROSS REFERENCE TO RELATED APPLICATIONS

This is a Continuation Application of PCT Application No. PCT/JP2006/319365, filed Sep. 28, 2006, which was published under PCT Article 21(2) in Japanese.

This application is based upon and claims the benefit of priority from prior Japanese Patent Application No. 2005-283422, filed Sep. 29, 2005, the entire contents of which are incorporated herein by reference.

BACKGROUND OF THE INVENTION

1. Field of the Invention

The present invention relates to a mica tape that is wound a plurality of times around the outer circumferential surface of a conductor of an electrical rotating machine coil so as to form an electric insulating layer, to an electrical rotating machine coil prepared by winding the mica tape around the electrical conductor so as to form a good insulating layer having a good heat conductivity, and to an electrical rotating machine using the electrical rotating machine coil.

2. Description of the Related Art

It is known to the art that a coil is used as a stator winding or a rotor winding in an electrical rotating machine such as a dynamo or an electric motor. The coil is prepared by winding a plurality of times a mica tape around an electrical conductor formed of, for example, a flat element wire having a rectangular cross section so as to impart electrical insulating properties to the coil, followed by heating under pressure the mica tape together with an adhesive resin so as to form an integral structure of an insulating layer.

FIG. 7 is a cross-sectional view exemplifying the construction of a stator coil of an electrical rotating machine including an insulating layer formed of the conventional mica tape.

As shown in FIG. 7, a slot 53 is formed in a stator core 51 prepared by laminating a plurality of electromagnetic steel plates one upon the other.

A stator coil 52 formed of an element wire having a rectangular gross section is housed in the stator core 51. The stator coil 52 comprises a conductor portion 52a and an insulating layer 52b formed around the conductor portion 52a. In general, the stator coil 52 has a double layer structure including an upper coil and a lower coil. In this case, however, the stator coil 52 alone is shown as the lower coil in the drawing for the sake of brevity. It should be noted that under the lower coil 52 is arranged a spacer 54 in a space between the lower coil 52 and the bottom portion of the slot 53.

In some cases, it is possible for a high voltage and a large current to be applied to the conductor portion 52a of the coil 52 depending on the specification of the electrical rotating machine. Such being the situation, an insulating layer 52b is formed around the conductor portion 52a in order to avoid an accident such as the ground short-circuit caused by the applied high voltage. For forming the insulating layer 52b, it was customary in the past to wind a plurality of times a mica tape 61 having a cross-sectional structure as shown in FIG. 8 around the conductor portion 52a, followed by heating the mica tape under pressure so as to form an integral structure of the insulating layer 52b excellent in the electrical insulating properties.

As shown in FIG. 8, the mica tape 61 comprises a mica layer 63 including a plurality of scale-like mica foils 62 that are laminated one upon the other so as to form a layer-like structure and a glass cloth 64 laminated below the mica layer 63 for reinforcing the mica layer 63. The glass cloth 64 is prepared by weaving glass fibers 65 in vertical and lateral directions. Mica is widely used as a material excellent in electrical insulating properties. However, since the bonding strength among the scale-like mica foils is weak, it is difficult to use a tape prepared by simply bonding the mica foils for the fastening purpose.

Such being the situation, the glass cloth 64 prepared by vertically and laterally weaving the glass fibers 65 is included for the reinforcing purpose in the mica tape 61 so as to make it possible to use the mica tape 61 to be wound around the conductor portion 52a with a high tension.

On the other hand, if a large current flows within the conductor portion 52a of the coil 52, Joule heat is generated within the conductor portion 52a because of the Joule loss. Therefore, it is necessary to remove the Joule heat generation efficiently. The Joule heat generation can be removed by the cooling with, for example, a hydrogen gas or the air. In any case, it is necessary to remove the heat from the conductor portion 52a via the insulating layer 52b.

Since the heat conductivity of the insulating layer 52b greatly affects the entire cooling capacity, it was customary to study in the past how to improve the heat conductivity of the insulating layer 52b. To be more specific, it was proposed in the past to add an inorganic filler (not shown) as a material having a high heat conductivity to the glass cloth 64 included in the mica tape 61.

A mica tape containing aluminum oxide as an inorganic filler having a high heat conductivity is disclosed in, for example, Japanese Patent Disclosure (Kokai) No. 2003-9446.

Inorganic fillers excellent in the heat conductivity also include aluminum nitride and silicon nitride in addition to the aluminum oxide noted above.

However, any of the inorganic fillers excellent in the heat conductivity exemplified above has a high hardness. For example, aluminum oxide has a Mohs hardness of 12.

As described previously with reference to FIG. 8, the glass cloth 64 prepared by weaving the glass fibers 65 is used for reinforcing the mica tape 61. It should be noted that glass has a Mohs harness of about 7. In the case of using a mica tape prepared by adding aluminum oxide having a Mohs hardness of 12 as a filler, it was possible for the aluminum oxide to damage the glass cloth 64 particularly at the corner portion of the conductor when the mica tape is wound about the conductive wire having a rectangular cross section, with the result that the glass cloth 64 is broken, leading possibly to the breakage of the mica tape.

Particularly, in order to form the insulating layer 52b as strong as possible, the mica tape is wound a plurality of times about the element wire having a rectangular cross section. In winding the mica tape, it is necessary to increase the tension of the mica tape as much as possible so as to permit the mica tape to be brought into contact more strongly with the element wire. With increase in the tension noted above, the compressive strength applied within the mica tape is increased, with the result that the planar pressure applied between the glass cloth and the inorganic filler is also increased. It follows that the mica tape tends to be broken easily so as to make it impossible to increase the tension as much as required. As a result, a gap is generated between the formed insulating layer and the surfaces of the wire element having a rectangular cross section. Such being the situation, the heat dissipation and the insulating properties were not sufficiently satisfactory.

BRIEF SUMMARY OF THE INVENTION

An object of the present invention, achieved in view of the situation described above, is to provide a mica tape, which is not broken even if the tape is wound about a conductive portion while applying a prescribed tension to the tape and which permits forming an insulating layer that fully exhibits the characteristics of the inorganic filler, to provide an electrical rotating machine coil using the mica tape and to provide an electrical rotating machine comprising the electrical rotating machine coil.

A mica tape according to an aspect of the present invention comprises a mica foil layer, a glass cloth and an inorganic filler particle layer arranged on the glass cloth. The mica tape is wound a plurality of times about the outer circumferential surface of a conductor portion of, for example, an electrical rotating machine coil so as to form an insulating layer for the coil. The inorganic filler noted above has a high heat conductivity. It is possible to use a single kind of an inorganic filler having a high heat conductivity or a Mohs hardness equal to or smaller than that of the glass used in the glass cloth. It is also possible to use in combination a plurality of kinds of inorganic fillers having a high heat conductivity and a Mohs hardness equal to or smaller than that of the glass used in the glass cloth. It is desirable for the inorganic filler to have a heat conductivity equal to or superior to that of the mica foil and the glass cloth.

According to the present invention, added to the glass cloth is an inorganic filler excellent in the thermal conductivity and having a Mohs harness not higher than that of the glass cloth to form a mica tape according to the present invention. As a result, even if the mica tape is wound about the conductive portion while applying a prescribed tension to the mica tape, the mica tape is not broken. In addition, it is possible to form an insulating layer exhibiting the highest heat conductivity owned by the inorganic filler. It should also be noted that, if an electrical rotating machine coil is formed by winding a plurality of times the mica tape of the present invention about a coil conductor, it is possible to miniaturize the electrical rotating machine coil as well as the electrical rotating machine and to improve the reliability of the electrical rotating machine, compared with the conventional electrical rotating machine.

BRIEF DESCRIPTION OF THE SEVERAL VIEWS OF THE DRAWINGS

FIG. 1 is a cross-sectional view showing the construction of a part of the mica tape used for forming an insulating layer of a stator coil of an electrical rotating machine according to one embodiment of the present invention;

FIG. 2 is a view showing the winding properties of the mica tape according to the present invention with respect to a coil conductor in comparison with the conventional mica tape;

FIG. 3 is a cross-sectional view showing the construction of a part of the mica tape according to another embodiment of the present invention;

DETAILED DESCRIPTION OF THE INVENTION

Figure 4:
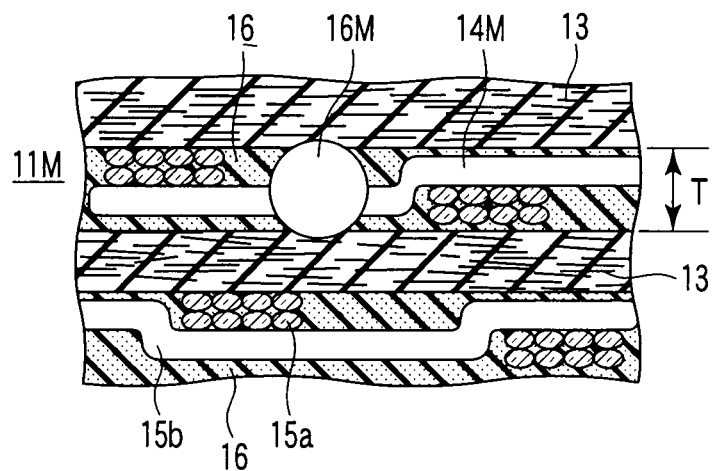
FIG. 4 is a cross-sectional view showing the construction of a part of the state that a mica tape according to another embodiment of the present invention is wound about a coil conductor.

Embodiments of the present invention will now be described with reference to the accompanying drawings.

First Embodiment

FIG. 1 is a cross-sectional view showing the construction of a mica tape according to a first embodiment of the present invention.

The mica tape 11 shown in FIG. 1 comprises a mica layer 13 including scale-like mica foils 12 arranged to form the layer, a glass cloth 14 laminated on the lower side of the mica layer 13, and an inorganic particle layer 16 added to the glass cloth 14.

The glass cloth 14 is prepared by weaving warps 15a and wefts 15b each obtained by stranding a plurality of glass fibers. These warps 15a and wefts 15b are woven at a prescribed density. In the embodiment shown in the drawing, 8 warps 15a and 8 wefts 15b are arranged in the vertical and lateral directions so as to weave the glass cloth 14. A quartz glass having a Mohs hardness of 7 is used as a glass material used for forming the glass fiber.

An electrically insulating glass cloth is used as the glass cloth 14. The density, the tensile strength, etc. of the glass cloth are defined in, for example, JIS R3414. The density is classified by the thickness of the single yarn used, which is represented by the number n (n/25 mm) of single yarns that can be put within a clearance of 25 mm. Also, the tensile strength is determined in conjunction with the density noted above. The density and the tensile strength of the glass cloth 14 is determined in each of the vertical direction and the lateral direction of the glass cloth.

In actually forming the mica tape 11, it is necessary for the mica layer 13 and the inorganic filler particle layer 16 to be held on the glass cloth 14. In addition, in order to form the insulating layer around the conductor portion of the coil, it is necessary to wind the mica tape 11 around the conductor portion of the coil, followed by heating the mica tape 11 under pressure together with a thermosetting adhesive resin so as to form an insulating layer integral with the conductor portion of the coil. The thermosetting adhesive resin used in this step was prepared by allowing the glass cloth 14 to be impregnated with a mixture obtained by mixing inorganic filler particles with an epoxy resin containing an acid anhydride curing agent, e.g., Epicoat 828 or 1001 manufactured by Yuka shell K.K. Then, the epoxy resin composition is converted into a semi-hardened state (conversion into B-stage) so as to form the state of a prepreg.

In this embodiment, quartz having a Mohs hardness of 7 is used as a glass material for forming the glass cloth 14. Therefore, it is possible to use a single kind of an inorganic filler having a Mohs hardness not larger than 7 or a mixture of a plurality of inorganic fillers having a Mohs hardness not larger than 7, i.e., inorganic fillers having 1 to 7 Mohs hardness. For example, aluminum hydrate having a Mohs hardness of 3, which was manufactured by Nippon Light Metal K.K. was used in an amount of 25% by weight of the mica layer 13. Incidentally, since the quartz having a Mohs hardness of 7 has the highest hardness among the glass material, a satisfactory result can also be obtained when the Mohs hardness of the glass material is examined so as to select the inorganic filler used in the case of using another glass material.

After a modeled aluminum bar having an angular cross section was wound a prescribed number of times with the mica tape of the construction given above while applying a prescribed tension to the mica tape, the aluminum bar was drawn for 2 hours or more under a vacuum environment, followed by applying a heat treatment under the conditions suitable for the curing conditions of the thermosetting epoxy resin composition while applying a prescribed pressure to the heated portion.

As a result of the experiment, the prepared mica tape was not broken during the winding operation of the mica tape around the conductor. As a result, it was possible to form a flame retardant insulating layer exhibiting a satisfactory anti-tracking capability caused by the physical nature of the aluminum hydrate. Also, since the aluminum hydrate exhibits a heat conductivity of 3 W/m·K, which is higher than the heat conductivity of about 1 W/m·K of the mica, the heat conductivity was improved effectively, compared with the conventional mica tape.

It suffices to use an inorganic filler 16 having a Mohs hardness of 7 to 1 in the mica tape 11 in combination with the glass cloth 14 formed of quartz glass. It is also possible to use magnesium oxide and a hexagonal boron nitride having a Mohs hardness of 6 and having a good heat conductivity may be used singly or in combination with one or more of inorganic materials having a Mohs hardness of 7 to 1. The heat conductivity of the insulating layer can be further improved by using these inorganic fillers.

FIG. 2 is a view showing a table denoting the results of the comparative experiments in respect of the characteristics of the mica tapes using alumina, aluminum hydrate and magnesium oxide, respectively, as an inorganic filler.

FIG. 2 is directed to the winding properties of a mica tape. Specifically, a mica tape was wound about a metal column conductor modeling as a coil conductor such as an aluminum column conductor with a prescribed tension imparted to the mica tape so as to visually observe the breakage of the tape.

As a result, a high resistance of the tape to the breakage was exhibited by Comparative Example 2 in which was used aluminum hydrate having a Mohs hardness of 3 and by Comparative Example 3 in which was used as an inorganic filler magnesium oxide having a Mohs hardness of 6. In each of these Comparative Examples 2 and 3, the mica tape was not broken. On the other hand, the resistance of the tape to the breakage was very small in Comparative Example 1 in which alumina particles were used as inorganic filler particles having a Mohs hardness of 12. In this case of the Example 1, the mica tape was promptly broken and, thus, cannot be wound about the metal column.

Also, Comparative Examples 2 and 3 were compared with each other in respect of the resistance of the tape to the breakage. As apparent from FIG. 2, Comparative Example 2 using an inorganic filler having a lower Mohs hardness was found to be higher than Comparative Example 3 in the mechanical resistance of the mica tape to the breakage. It is considered reasonable to understand that the inorganic filler having a lower Mohs hardness is less likely to do damage to the glass fiber forming the base material of the mica tape with the result that Comparative Example 2 using an inorganic filler having a lower Mohs hardness was found to be higher than Comparative Example 3 in the resistance of the mica tape to the breakage as pointed out above.

As pointed out above, it is possible to avoid the breakage of the mica tape during the winding operation of the mica tape under the state of applying a tension to the mica tape by using an inorganic filler equal to or softer than the Mohs hardness of the glass material constituting the glass cloth.

Second Embodiment

A second embodiment of the present invention will now be described.

The mica tape according to the second embodiment is substantially equal to that according to the first embodiment described above, except that a binder insoluble in an impregnating resin used in the heating step of the coil under pressure is used for holding an inorganic filler 9.

A mica tape was wound a plurality of times about a modeling coil conductor made of an aluminum bar having a rectangular cross section by applying a prescribed tension to the mica tape, followed by performing a vacuum drawing for 2 hours or more to subsequently allow the mica tape to be impregnated with an impregnating thermosetting resin.

The impregnating resin noted above comprised 45% by weight of alicyclic epoxy compound, 40% by weight of an acid anhydride curing agent and 15% by weight of a reactive diluent, which was disclosed in Japanese Patent Disclosure (Kokai) No. 11-345733.

Since the impregnating resin has a low viscosity of about 30 mpa·s at room temperature, it is possible for the inorganic filler to flow out in general in the following heating stage of the impregnated resin.

However, in the second embodiment of the present invention, the mica tape can be wound under a high tension, with the result that the inorganic filler held in the impregnating resin by using an insoluble binder is strongly held between the adjacent mica layers. Therefore, even after the heating process after impregnation of the resin, it was possible to suppress the flow of the inorganic filler from the mica tape.

Third Embodiment

A third embodiment of the present invention will now be described.

In the third embodiment, a sparse glass cloth having a wide clearance among the adjacent yarns is used as a glass cloth constituting one element of the mica tape. As shown in, for example, FIG. 3, the density of the warps 15*a* of the glass cloth 14M was made half the density of the warps 15*a* shown in FIG. 1. In this case, the density of the wefts 15*b* was made equal to that shown in FIG. 1. In this case, the density of the warps 15*a* of the glass cloth 14M is made lower, with the result that a large number of inorganic fillers 16 are arranged in the mesh defined by the warps 15*a* and the wefts 15*b* of the glass cloth 14. It follows that the contact area among the warp 15*a* and the weft 15*b* of the glass fiber and the inorganic filler 16 is made larger than that in the case of FIG. 1.

In the case of using inorganic filler particles having a Mohs hardness exceeding 7 such as alumina as in the conventional case, the glass cloth 14M was broken easily, resulting in failure to tightly wind the mica tape around an aluminum bar modeling the coil conductor under a prescribed tension.

On the other hand, in the case of using an aluminum hydrate as an inorganic filler, the mica tape 11 can be wound tightly without being broken because aluminum hydrate has a Mohs hardness of 3 and, thus, is very soft compared with glass.

As described above, in the case of using a sparse glass cloth 14M having the distance between the adjacent weaving strings broadened by selectively removing the warps, for example, it is possible to lower the ratio of the glass fiber occupied in the entire mica tape while maintaining the breakage resistance of the mica tape to which is applied the tension when the mica tape is wound about the column coil conductor in the winding stage of the mica tape. It follows that it is possible to increase the loading amount of the aluminum hydrate in the mica tape. Such being the situation, it is possible to impart the desirable characteristics of the aluminum hydrate such as the resistance to the tracking characteristics, the flame retardancy and the thermal conductivity to the mica tape 11M.

Fourth Embodiment

A fourth embodiment of the present invention will now be described.

In the embodiments shown in FIGS. 1 and 3, the particle diameter of the inorganic filler was smaller than the thickness of the glass cloth 14, 14M. In the fourth embodiment, however, inorganic fillers added to the mica tape 11M may include an inorganic filler 16M having a particle diameter larger than the thickness of the glass cloth 14M as shown in FIG. 4. The inorganic filler 16M may be used singly or in addition to the inorganic fillers 16 having a smaller particle diameter. For example, hydrates of aluminum particles having a particle diameter of 55 μm were used in combination with the glass cloth having a thickness of 30 μm.

As apparent from FIG. 4, the stress applied to the outer circumferential surface of the coil conductor in winding the mica tape 11M around the coil conductor while applying a tension to the mica tape 11M is transmitted mainly to the inorganic filler 16 and to the two mica layers 13 adjacent to the upper and lower surfaces of the inorganic filler 16. Such being the situation, it was possible to prevent the glass cloth 14M from being broken and to suppress the breakage of the mica tape 11M.

In the mica tape 11M according to the fourth embodiment of the present invention, the inorganic filler 16M having a particle diameter larger than the thickness of the glass cloth 14M is arranged between the adjacent glass cloths 14M. As a result, the inorganic filler layers 16 positioned inside the insulating layer formed by winding the mica tape a plurality of times is brought into direct contact with the adjacent mica layers 13. It follows that the heat conductivity between the adjacent mica layers via the inorganic filler layers including the inorganic filler 16M is improved so as to make it possible to obtain an insulating layer exhibiting a good heat conductivity.

Where the particle diameter of the inorganic filler is smaller than the thickness of the glass cloth as in each of the embodiments shown in FIGS. 1 and 3, the occasion in which the inorganic fillers in the upper and lower mica layers are brought into direct contact with each other is lowered, with the result that a resin having a low heat conductivity is interposed in a larger amount between the upper and lower mica layers or between the inorganic filler layers. It follows that it is difficult to obtain a high heat conductivity, i.e., the effect of obtaining a large heat conductivity, though it is certainly possible to obtain the effect of preventing the breakage of the mica tape in the stage of winding the mica tape around the coil conductor. However, a further improvement can be obtained in the embodiment shown in FIG. 4 in this respect, as mentioned above.

Each of the embodiments described above is directed to the case of using aluminum hydrate as an inorganic filler. However, it is also possible to use magnesium oxide, e.g., "PYROKISUMA" manufactured by Kyowa Kagaku K.K. in place of aluminum hydrate so as to impart a high heat conductivity of aluminum oxide to the mica tape.

Magnesium oxide has a heat conductivity of 48 W/m·K, which is higher than that of aluminum hydrate and, thus, a high heat conductivity can be imparted to the mica tape more effectively.

In addition, magnesium oxide has a Mohs hardness of 6, which is lower than that of glass. As a result, the glass cloth is not damaged in the case of using magnesium oxide. It follows that the mica tape may not be broken when the mica tape is wound around the coil conductor.

It should also be noted that a hexagonal boron nitride, e.g., "SHOBN" manufactured by Showa Denko K.K., which has a low Mohs hardness and a high heat conductivity, can be used in place of aluminum hydrate. Further, since the hexagonal boron nitride exhibits an effect of low friction characteristics, the sliding of the tape is facilitated during the winding operation of the mica tape, with the result that the tape can be wound about a coil conductor easily under a high tension.

Additional inorganic fillers which can be used in the present invention include, for example, calcium carbonate, magnesium hydroxide, Talc, and mullite. Calcium carbonate has a Mohs hardness of 4 and a heat conductivity of 3 W/m·K. Magnesium hydroxide has a Mohs hardness of 4. Talc, which is a water-containing magnesium silicate, has a Mohs hardness of 1. Further, mullite has a Mohs hardness of 3 and a heat conductivity of 6 W/m·K. It is possible for the mullite to be provided by a mullite powder manufactured by Kyoritsu Material K.K.

Fifth Embodiment

A fifth embodiment will be described in detail.

Used in this embodiment are two kinds of inorganic fillers differing from each other in the particle diameter. To be more specific, the first inorganic filler has a prescribed particle diameter substantially equal to that of, for example, the thickness of the glass cloth. On the other hand, the second filler has a particle diameter not larger than 30% of the particle diameter of the first inorganic filler.

Where the second inorganic filler has a particle diameter not larger than 30% of the particle diameter of the first inorganic filler as pointed out above, the second inorganic fillers are held among the clearances formed by the first inorganic fillers. In this case, it is desirable for each of the first and second inorganic fillers to have a Mohs hardness not higher than the Mohs hardness of the glass cloth. In this case, it is necessary for the first inorganic filler that is brought into direct contact with the glass cloth to be formed of an inorganic filler having a Mohs hardness not higher than that of glass in order to prevent the breakage of the mica tape from being worried about. It follows that it is possible to use particles of an inorganic material having a Mohs hardness exceeding 7 and also having a particle diameter not larger than 30% of the particle diameter of the first inorganic filler as a second inorganic filler.

However, it is necessary for the amount of the second inorganic filler to be not larger than the total volume of the clearances formed among the first inorganic fillers.

Under the circumstances, aluminum hydrate particles having a particle diameter of 55 µm were used as the first inorganic filler relative to the glass cloth having a prescribed thickness, and aluminum hydrate particles having a particle diameter of 6.3 µm were added as the second inorganic filler to the first inorganic filler in an amount of up to 20% by volume so as to manufacture a mica tape.

The mica tape thus manufactured was wound experimentally about a rectangular aluminum bar formed as a modeling coil conductor, with the result that the tape was not broken during the winding process.

It is possible for the second inorganic filler to be formed of a material having a Mohs hardness exceeding 7 as far as the particle diameter and the additional amount of the second inorganic filler fall within the ranges given previously. For example, the second inorganic filler having a Mohs hardness exceeding 7 includes, for example, diamond, aluminum oxide, aluminum nitride and silicon nitride. Of course, it is also possible to use inorganic particles having a Mohs hardness not larger than 7 such as magnesium oxide and hexagonal boron nitride.

As described above, the second fillers are arranged within the clearances among the particles of the first inorganic filler, with the result that it is substantially impossible for the second inorganic filler to be brought into direct contact with the glass cloth. It follows that it is possible to avoid the damage done to the glass cloth when the mica tape is wound around the conductor under the state that the loading rate of the inorganic filler is improved so as to maintain, for example, a high heat conductivity.

On the other hand, where the particle diameter of the second inorganic filler was not larger than 10% of the fist inorganic filler, no improvement was recognized in the properties. Also, where the additional amount of the second inorganic filler was not larger than 5% by weight of the first inorganic filler, no improvement was also recognized in the properties.

Sixth Embodiment

A sixth embodiment of the present invention will now be described.

Figure 5:
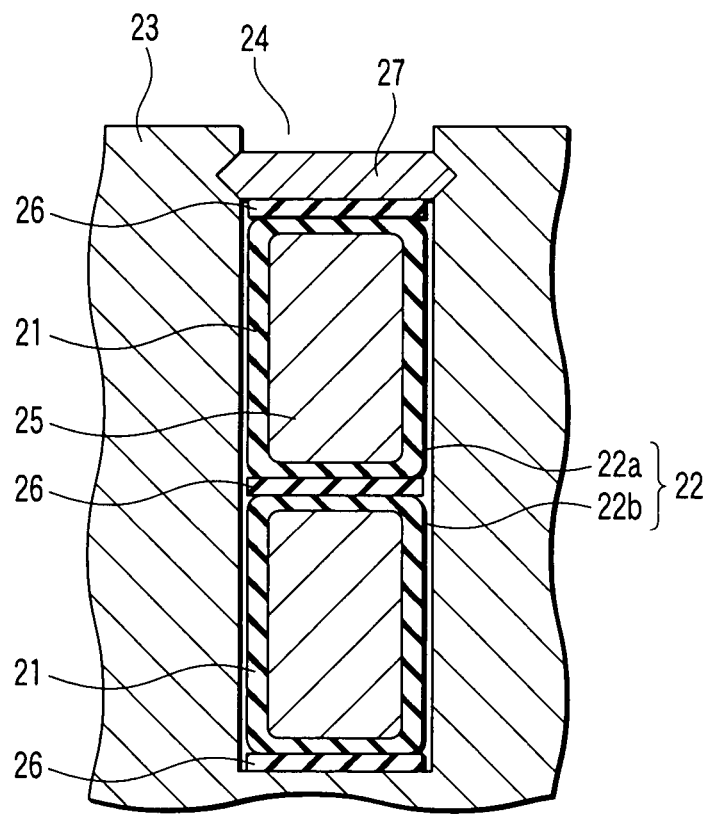
FIG. 5 is a cross-sectional view showing the construction of a stator coil according to still another embodiment of the present invention, the stator coil being housed in a slot of a stator core of an electrical rotating machine formed by using the mica tape shown in FIG. 1.

In the sixth embodiment, upper and lower stator coils 22a, 22b are manufactured as electrical rotating machine coils by forming an insulating layer 21 using a mica tape in any of the embodiments described above, and the stator coils 22a, 22b thus manufactured are housed in a slot 24 formed in the stator core 23 as shown in FIG. 5. Each of the upper and lower stator coils 22a, 22b includes the insulating layer 21 formed around the coil conductor portion 25, and spacers 26 are arranged in the bottom portion, the middle portion and the open portion of the slot 24, respectively. As shown in the drawing, a stator wedge 27 is fixed to the open portion of the slot 24 so as to permit the coils 22a, 22b to be fixed within the slot 24.

The stator 22 of the construction described above exhibited a satisfactory breakdown voltage and a good flame resistance and further exhibited the improvement of the heat conductivity in the case where the stator coils were prepared by winding the mica tape in each of the embodiments described above using aluminum hydrate as an inorganic filler, respectively.

Also, in the winding operation of the mica tape around the coil conductor, the mica tape was found to be substantially free from the breakage so as to make it unnecessary to carry out the frequent operations such as rewinding of the mica tape, with the result that the electrical rotating machine coil can be manufactured easily.

Further, in the case of using magnesium oxide or a hexagonal boron nitride as the inorganic filler, it is possible to improve markedly the heat conductivity of the electrical rotating machine coil. As a result, the temperature elevation of the stator coil 22 can be markedly suppressed so as to make it possible to miniaturize the entire electrical rotating machine when the electrical rotating machine coil is used therein.

Further, since the flame retardancy of the coil can be improved, it is possible to secure a satisfactory state of the electrical rotating machine over a long period of time. Further, since the breakdown voltage characteristic of the coil can be improved, it is possible to apply a high voltage to the electrical rotating machine so as to diminish the current flowing through the coil conductor. It follows that it is possible to lower the operating temperature and to improve the efficiency of the operation.

On the other hand, the insulating layer 21 prepared by winding the mica tape described previously, which is arranged in contact with the stator core 23 and the spacer 26 within the slot 24, receives a thermal stress accompanying the starting and stopping of the electrical rotating machine and also receives a mechanical stress caused by the thermal expansion and shrinkage. However, the inorganic filler within the mica tape used for forming the insulating layer in this embodiment has a Mohs hardness lower than that of the general inorganic filler such as aluminum oxide. It follows that it is possible to suppress the stresses generated within the insulating layer. As a result, the mechanical deterioration of the insulating layer 21 caused by the thermal stress accompanying a large number of times of starting and stopping of the electrical rotating machine is suppressed. It follows that it is possible to provide an electrical rotating machine including an insulated coil layer excellent in the reliability for a long time.

Figure 6:
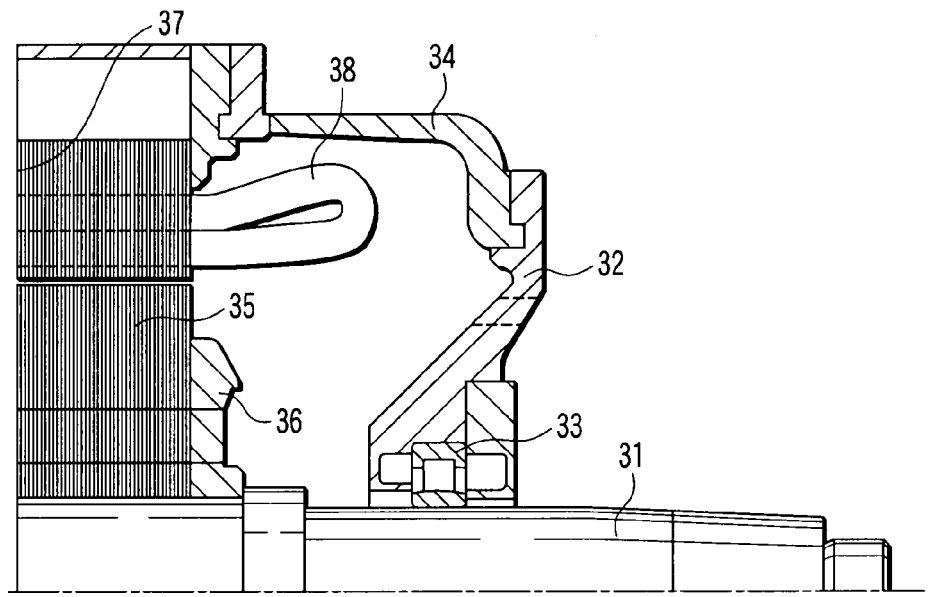
FIG. 6 is a cross-sectional view showing partly the construction of an electrical rotating machine according to still another embodiment of the present invention, the electrical rotating machine including the stator coil shown in FIG. 5.
Figure 7:
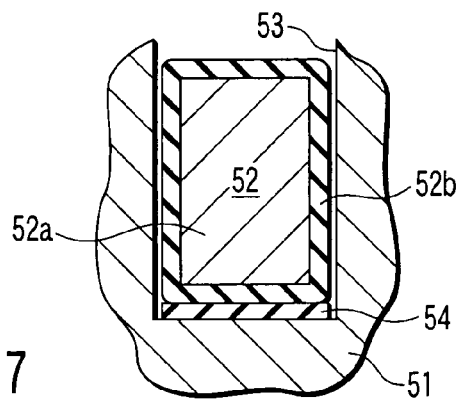
FIG. 7 is a cross-sectional view showing the construction of a stator coil arranged within the stator core included in the conventional electrical rotating machine.
Figure 8:
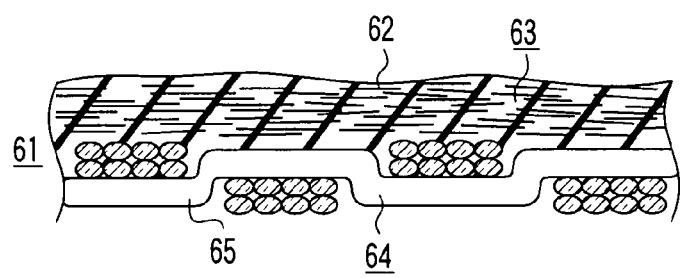
FIG. 8 is a cross-sectional view showing partly the construction of the conventional mica tape for forming an insulating layer around the stator coil shown in FIG. 7.

FIG. 6 is a cross-sectional view briefly showing the construction of an electrical rotating machine according to one embodiment of the present invention, which was constructed by forming an insulating layer by using a mica tape of the present invention. As shown in FIG. 6, a rotating shaft 31 is rotatably supported by a bearing 33 held by a bearing bracket 32. A rotor core 35 prepared by laminating a plurality of electromagnetic steel plates is mounted on the rotating shaft 31, and the rotor core 35 is fixed to the rotating shaft 31 by a core-suppressing plate 36. A stator core 37 held by the bracket 34 is arranged near the outer circumferential surface of the rotor core 35 like the rotor core 35. Slots are formed to extend in the axial direction of the stator core 37. The upper and lower stator coils 22a, 22b as shown in FIG. 5 are inserted into and fixed within each of the slots.

When the electrical rotating machine of the particular construction is prepared by using the electrical rotating machine coil 22 of the present invention as shown in, for example, FIG. 5, it is possible to provide an electrical rotating machine provided with a coil insulating layer that can be miniaturized and is excellent in the reliability for a long time.

As described above, the present invention provides a mica tape, which is not broken even if wound about a conductor while applying a prescribed tension and which makes it possible to obtain an insulating layer capable of exhibiting the characteristics of the inorganic filler to the highest degree, to provide an electrical rotating machine coil using the mica tape, and to provide a miniaturized electrical rotating machine exhibiting a high performance by using the electrical rotating machine coil.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A mica tape comprising:
a mica foil layer;
a single glass cloth on which the mica foil layer is provided; and
a particle layer of an inorganic filler having a Mohs hardness of 3 to 1 held on the glass cloth.

2. The mica tape according to claim 1, wherein the glass cloth is formed of quartz glass having a Mohs hardness of 7.

3. The mica tape according to claim 1, wherein the inorganic filler has a heat conductivity not lower than that of any of the mica foil and the glass cloth.

4. The mica tape according to claim 1, wherein the glass cloth is formed of a sparse glass cloth having a large distance between at least adjacent warps of the glass cloth.

5. The mica tape according to claim 1, wherein the inorganic filler includes an inorganic filler having a particle diameter larger than a thickness of the glass cloth.

6. The mica tape according to claim 1, wherein the inorganic filler includes a first inorganic filler and a second inorganic filler having a particle diameter not larger than 30% of a particle diameter of the first inorganic filler, and an amount by volume of the second inorganic filler is not larger than 20% of the first inorganic filler.

7. The mica tape according to claim 1, wherein the inorganic filler includes aluminum hydrate.

8. The mica tape according to claim 1, wherein the inorganic filler includes hexagonal boron nitride.

9. The mica tape according to claim 1, wherein the inorganic filler includes at least one material selected from the group consisting of Talc and mullite.

10. The mica tape according to claim 1, further comprising a thermosetting resin impregnated in the glass cloth, the thermosetting resin being B-staged so as to be in the form of a prepreg state.

11. The mica tape according to claim 1, further comprsing a binder insoluble in the thermosetting resin and serving to permit the inorganic filler to be held on the glass cloth.

12. An electrical rotating machine coil comprising:
a coil conductor; and
an insulating layer formed by winding around an outer circumferential surface of the coil conductor,
wherein the insulting layer is formed by winding a mica tape defined in any of claims 1 to 7 and 8 to 11 a plurality of times around the outer circumferential surface of the coil conductor, and
the mica tape wound about the coil conductor is heated under pressure together with a thermosetting resin so as to make the mica tape integral with the coil conductor.

13. The electrical rotating machine coil according to claim 12, wherein the coil conductor is formed of an element wire having a rectangular cross section.

14. An electrical rotating machine comprising:
a rotor;
a stator with a stator coil, the rotor being configured with respect to the stator,
wherein the stator coil has a structure as defined in claim 12.

* * * * *